(12) United States Patent
Ronning et al.

(10) Patent No.: US 7,799,360 B2
(45) Date of Patent: Sep. 21, 2010

(54) METHOD AND SYSTEM FOR WASHING EGGS SHELLS

(75) Inventors: Sandra Hruza Ronning, Shell Knob, MO (US); Brian Joseph Molloy, St. Clair Shores, MI (US)

(73) Assignee: BioNutraTech, Inc., Shell Knob, MO (US)

( * ) Notice: Subject to any disclaimer, the term of this patent is extended or adjusted under 35 U.S.C. 154(b) by 767 days.

(21) Appl. No.: 11/677,409

(22) Filed: Feb. 21, 2007

(65) Prior Publication Data

US 2007/0197415 A1 Aug. 23, 2007

Related U.S. Application Data

(60) Provisional application No. 60/775,181, filed on Feb. 21, 2006.

(51) Int. Cl.
*A23B 5/12* (2006.01)
(52) U.S. Cl. ............... 426/298; 426/302; 426/312; 426/422; 426/506; 426/69; 424/76.6; 424/76.8; 424/411
(58) Field of Classification Search ............... None
See application file for complete search history.

(56) References Cited

U.S. PATENT DOCUMENTS 5,725,885 A    3/1998 Felix
5,753,493 A *  5/1998 Wiersma .................. 435/261
5,756,139 A *  5/1998 Harvey et al. ............. 426/298
6,277,279 B1 * 8/2001 Hruza ...................... 210/610
2005/0180944 A1 * 8/2005 Hruza ...................... 424/76.1

FOREIGN PATENT DOCUMENTS

WO    WO 9504126    2/1995

OTHER PUBLICATIONS

PCT International Search Report, PCT/US2007/004385, Jul. 26, 2007, 3 pages.
PCT Written Opinion of the International Searching Authority, PCT/US2007/004385, Jul. 26, 2007, 5 pages.

* cited by examiner

*Primary Examiner*—Jennifer C McNeil
*Assistant Examiner*—Hong Mehta
(74) *Attorney, Agent, or Firm*—Jeffrey L. Streets; Streets & Steele

(57) ABSTRACT

The present invention provides a method for washing eggs with a wash mixture of water and composite particles that comprise a mixture of microbial nutrients bound together by a solid fatty acid material. The shells of eggs are contacted with the wash mixture and organic material is removed from the egg shells into the wash mixture. The composite particles in the wash mixture foster microbial degradation of the organic material within the wash mixture. The wash mixture leaves the egg shells whiter than enzyme solutions and maintains the cleaning action for a longer period of time.

16 Claims, No Drawings

METHOD AND SYSTEM FOR WASHING EGGS SHELLS

This application claims the benefit of priority to U.S. Provisional Application No. 60/775,181 filed on Feb. 21, 2006.

FIELD OF THE INVENTION

This invention relates to methods and systems for washing egg shells.

BACKGROUND OF THE INVENTION

The commercial production and distribution of eggs for human consumption must assure that the eggs do not pose a health risk. However, eggs are typically contaminated with fecal matter, dirt and debris from broken eggs, feathers, remnants of a litter substrate, and the like. This contamination can lead to growth of harmful bacteria that can even penetrate the egg shell. While bacterial contamination is generally not visible, the presence of visible contamination on the egg surface is aesthetically displeasing to consumers and may hide cracks. In present commercial practice, eggs are quickly washed with a sanitizing solution within minutes of being laid.

The task of washing eggs is complicated by the need to remove contamination from the egg surface and the need to avoid damaging the egg shell. These two needs must be met simultaneously. A wash solution that cannot remove contamination is not suitable. For example, washing eggs with water alone is generally not suitable because water alone does a poor job of removing organic material from the egg shell surface or from cleaning up after an occasional broken egg. Similarly, a wash solution that damages the egg shell is not suitable either. For example, a strong bactericidal solution may damage the porosity of the egg shell.

A number of chemical approaches to egg washing have been tried. These chemical treatments include chlorine based disinfectants, quaternary ammonium salt disinfectants, peracetic acid solutions, surfactants and enzymes. However, these chemical treatments are not entirely suitable because these chemicals either quickly lose their activity, exhibit poor biodegradability themselves, require long contact times, provide insufficient removal of contaminants or damage the egg shell.

Therefore, there is a need for a method and system for washing egg shells that removes contamination efficiently without damaging the egg shells. It would be desirable for the method and system to exhibit extended activity, utilize compositions that are themselves biodegradable, provide effective removal of contaminants, and avoid damaging the egg shell. Furthermore, it would be desirable if the method and system could effectively remove physical contaminants adhering to the egg surface, but also could remove, destroy or prevent harmful bacterial contaminants or pathogens. Still further, it would be beneficial to have a method and system that could wash egg shells to remove stains or other visual defects and improve the yield of eggs that meet commercial standards.

SUMMARY OF THE INVENTION

The present invention provides a method for washing egg shells. The method comprises preparing a wash mixture of water and composite particles, wherein the composite particles comprise a mixture of microbial nutrients bound together by a solid fatty acid material. The method continues with the steps of contacting shells of eggs with the wash mixture, removing organic material from the egg shells into the wash mixture, and using the composite particles in the wash mixture to foster microbial degradation of the organic material within the wash mixture. The organic material comes from the surface of the egg shells and from the yoke of any cracked eggs. Beneficially, the microbial degradation suppresses the growth of harmful bacteria, such as Salmonella.

Preferably, the step of contacting shells of eggs with the wash mixture includes spraying the wash mixture over the egg shells, collecting the sprayed wash mixture, and reusing the wash mixture to contact additional egg shells. Eventually, the method may include discarding the used wash mixture, and continuing to use the composite particles to foster microbial degradation of the organic materials within the discarded wash mixture.

The microbial nutrients preferably include nitrogen, phosphorous, and iron. Suitably, the nitrogen may be in the form of an ammonium compound and the phosphorous may be in the form of a phosphate compound.

The fatty acid material is a mixture of an unsaturated fatty acid and a saturated fatty acid, preferably forming a solid at ambient temperatures. In a preferred mixture, the saturated fatty acid is selected from stearic acid, palmitic acid, lauric acid and mixtures thereof, and the unsaturated fatty acid is selected from oleic acid, linoleic acid, and mixtures thereof. Preferably, the ratio of saturated fatty acid to the unsaturated fatty acid is between 70:30 and 30:70 by weight. Optionally, the wash mixture further includes a surfactant, an enzyme species, microorganisms, or combinations thereof.

Preferably, the composite particles are ground into a powder. Suitably, the wash mixture is substantially free of bactericidal chemicals. It is also preferred that the wash mixture contains microorganisms that are substantially only indigenous microorganisms.

Another embodiment of the invention provides an egg washing concentrate solution. The concentrate solution comprises an aqueous mixture of surfactants and composite particles the size of a powder, wherein the composite particles comprise a mixture of microbial nutrients bound together by a fatty acid material, and wherein the composite particles comprise between 20 and 100 grams per gallon of water. The concentrate solution may optionally further comprise enzymes, microbes or a combination thereof. Preferably, the egg washing concentrate solution is incubated between 1 and 14 days prior to use.

DETAILED DESCRIPTION OF THE INVENTION

The present invention provides a method for washing eggs with a wash mixture of water and composite particles that comprise a mixture of microbial nutrients bound together by a solid fatty acid material. The shells of eggs are contacted with the wash mixture and organic material is removed from the egg shells into the wash mixture. The composite particles in the wash mixture foster microbial degradation of the organic material within the wash mixture. The wash mixture leaves the egg shells whiter than enzyme solutions and maintains the cleaning action for a longer period of time.

In one embodiment, the wash mixture is prepared a sufficient period of time prior to use so that a desirable growth of microbes can occur in the wash mixture prior to washing any eggs. For example, it is desirable to mix the water and composite particles before beginning the wash cycle, such as about 15 minutes.

The wash mixture may contact the eggs in various manners. For example, the eggs may be passed through a bath filled with the wash mixture or the wash mixture may be made to flow over the eggs, such as by spraying. It is generally desirable to collect and reuse or recycle the wash mixture for at least a period of 4 to 8 hours before discarding the wash mixture and starting subsequent egg washing with a fresh wash mixture.

The wash mixture may include any number or type of additives to control one or more performance parameter of the mixture. For example, the wash mixture may include enzymes, surfactants, defoamers, and the like. Optionally, the wash mixture, or the composite particles themselves, may include an oxygen-releasing compound or non-indigenous microbes. Because the use of indigenous microbes has been shown to be quite sufficient, engineered microbes are discouraged as representing an unnecessary expense.

In a typical egg washing process, the eggs are placed on a conveyer that passes over two water tanks, for example 160 gallons each. Above the wash tanks, but below the conveyer, there are nets or screens made of lightweight material positioned to catch debris from the broken eggs that fall from the conveyer. Above the eggs are two sets of sprayers that wash the egg shells as they pass under. A system of pipes and pumps recirculate the wash mixture from the tank to the sprayers for contacting additional eggs.

After the eggs pass under the second set of sprayers, the eggs are dried and their shells are inspected. Eggs with shells that are cracked are removed and discarded. In newer systems, the eggs having broken or cracked shells are removed automatically. The equipment may also divert eggs having dirty shells back through the wash station to be washed a second time. The clean eggs are then divided by size and packaged accordingly. One such system made by Diamond Systems will wash 72,000 eggs per hour.

Over a four-hour period using conventional wash solutions, the system typically uses about 1,040 gallons of water. One hundred, sixty gallons of water are provided in each of two wash tanks when the process begins (about 320 gallons), with a constant flow of fresh water at a rate of three gallons per minute for four hours (about 720 additional gallons). After the four-hour operating period, the system is flushed and the process begins again. However, using the wash mixture of the present invention, it is believed that the operating period can be lengthened significantly while preserving the effectiveness of the egg shell washing.

Some prior processes maintain a pH of at least 10.5 (i.e., greater than or equal to pH 10.5) during the wash process, so that salmonella coming from the surface of dirty eggs is killed. In accordance with the present invention, a pH of between 10 and 10.5 is preferred. Since the shell of the egg is porous, there is potential for the wash water to pass through the shell and into the egg. Accordingly, it is necessary to kill any salmonella entering the wash mixture before the water is sprayed over the eggs. The caustic product used to raise the pH must also penetrate the whites from the broken eggs. Furthermore, if the whites are allowed to sit on the lightweight nets, the water will not be able to flow back into the tanks, but rather will run off onto the floor causing not only a mess, but also creating a shortage of egg washing formula. The wash formula will preferably also contain a defoamer that keeps the eggs whites from creating a foam that causes other problems in the wash system.

Depending upon the extent of nutrients released into the wash from the eggs, the fatty acids may be used without the inclusion of one or more of the nutrients in the composite particles and still promote microbial growth. Accordingly, the fatty acids may still increase indigenous microbe growth and subsequent biodegradation of the organic waste products. Still, it is preferred to include nutrients with the fatty acids as part of the composite particles.

The preferred formulations of this invention use a mixture of saturated and unsaturated fatty acids to form a composite which is readily biodegradable and has physical properties making it efficient for promoting microbial growth. More particularly, the fatty acids form a biodegradable composition comprising oleic acid and a carboxylic acid selected from the group consisting of stearic acid, palmitic acid, and mixtures thereof. The preferred formulation may also be prepared with any ratio of saturated fatty acids and unsaturated fatty acids where the resulting material is sufficiently biodegradable to release fatty acids. As a practical matter, the fatty acids preferably have a sufficiently high melting point temperature to allow the material to be stored as particles without clumping together. The preferred ratio of oleic acid (or any of the unsaturated fatty acids) to the saturated fatty acids is between about 70:30 and about 30:70 by weight, most preferably between 60:40 and 40:60 by weight.

The composite particles that are used in the wash mixture are preferably made in accordance with the methods and compositions set out in U.S. Pat. Nos. 5,725,885 and 5,443,845, which are hereby incorporated by reference. In short, the solid particle or powder composite is made by heating the fatty acids to melting at about 100° C., mixing the fatty acids with the nutrients, then cooling the mixture to produce a homogenous solid composite mixture that is ground until the desired particle size is achieved. The desired particle size is preferably small enough to pass through a number 40 sieve. The preferred composite comprises between 5 and 20 percent of the fatty acids and the remainder nutrients and, if any, oxygen-releasing compounds and/or microbes.

The preferred nutrient formulations for fostering the growth of microbes have the following exemplary proportions (the percentages here are based only on the weight of the nutrients, excluding any coating, oxygen-containing compounds, etc.):

between about 80 and about 90 percent (%) by weight of a source of nitrogen selected from ammonium sulfate $(NH_4)_2SO_4$, urea and combinations thereof;

between about 5 and about 8 percent (%) by weight potassium phosphate dibasic $K_2HPO_4$ or substitutions such as potassium phosphate monobasic $KH_2PO_4$ or calcium phosphate monobasic $CaHPO_4$, dibasic $Ca(H_2PO_4)_2$ or tribasic $Ca_3(PO_4)_2$, urea phosphate, or ammonium phosphate $NH_4H_2PO_4$; and between about 1 and about 2 percent (%) by weight ferrous sulfate $FeSO_4$ or a substitution such as ferrous sulfate heptahydrate $FeSO_4*7H_2O$.

A particularly preferred coated nutrient composition includes the following ingredients (the percentages here are based on the total weight of the coated nutrient composition):

Nutrients: 85 wt. % ammonium sulfate $[(NH_4)_2SO_4]$:
   5 wt. % dry fertilizer (urea, diammonium phosphate, potassium chloride, limestone, dolomite limestone, ammonium sulfate, potassium sulfate, superphosphate, corncobs (pulverized), calcium lignosulfonate, mineral oil, sulfur); and
   1 wt. % chelated iron
   The nutrients above are blended to pass a number 60 sieve before coating.

Coating: 7 wt. % coating material (60 wt. % oleic acid; and 40 wt. % stearic acid)

Anticaking Agent: 2 wt. % synthetic amorphous silica.

The materials above are passed through a number 40 sieve before packaging or use.

The most preferred nutrient formulations have an ammonium/urea; phosphate-compound: iron compound ratio between about 90:8:2 and about 94:5:1. The precise formulation of nutrients can vary according to the specific type of microorganism present (on the eggs, in the dirt or waste, in the wash water, or included in the present composition), the composition of the waste products, and the current costs of each nutrient source. The nutrient formulation is mixed together as dry ingredients and ground into a powder sufficient to pass a U.S. standard number 40 sieve. It has also been found that a suitable source of iron is in the form of chelated iron.

The composite material is preferably manufactured either as a powder, pellet or a cake, most preferably a powder. The microbes will, over time, consume the composition as well as the surrounding organic wastes. Supplemental applications of the composite can be made to the wash water to ensure sufficient amounts of fatty acids and nutrients are available to foster and sustain enhanced microbial growth.

The exact interval and the weight of product per unit volume of wash liquid is based upon factors such as the degree of organic contamination, composition of the organic waste, type of bacteria present and microbial activity. However, a preferred wash solution comprises between 20 and 100 grams of the nutrient composite per gallon of water, more preferably between 30 to 70 grams per gallon, and most preferably between 40 and 60 grams per gallon. These concentrations of the nutrient composite may support a normal wash operation for about 2 weeks, depending upon the organic load introduced into the wash solution from the egg shells and broken eggs.

In one embodiment, the fatty acid composition may be mixed with compounds that provide a source of molecular oxygen including, but not limited to, calcium peroxide and urea hydrogen peroxide. These compounds are believed to release molecular oxygen ($O_2$) by enzymatic or chemical reactions. This molecular oxygen is utilized by the microorganisms to enhance and promote aerobic metabolism throughout the waste environment rather than solely at the interface with the atmosphere. These oxygen releasing compounds may be incorporated into the fatty acid compositions described herein. When used, the oxygen-releasing compounds preferably comprise between about 1 and about 20 percent (%) by weight of the fatty acids.

Because hydrogen peroxide is known to be unstable in aqueous solutions and is also toxic to microorganisms at high concentrations, the oxygen releasing compounds of hydrogen peroxide are incorporated as encapsulated particulates. Utilization of hydrogen peroxide and peroxide compounds to enhance microbial growth has been well documented, but has seen little practical application in the field because of the previously noted problems of poor stability and toxicity. The encapsulation of the particulate peroxide compounds (as example being, but not limited to, urea hydrogen peroxide) stabilize the materials by keeping the compounds from rapidly reacting with water or divalent cations which promote peroxide degradation (for example $Fe^{+2}$). The encapsulation also prevents the toxicity of rapid peroxide decomposition from affecting the microorganisms through regulated release of compounds at concentrations that support microbial growth and limit promotion of toxic oxygen radicals.

Examples of suitable equipment for egg washing that will benefit from the present invention are described in U.S. Pat. No. 6,029,424 (assigned to Diamond Automations, Inc.), which patent is incorporated by reference herein. The wash mixture and the methods of the present invention are preferably carried out in equipment such as this. It should be recognized that the remediating action of the wash mixture is not only effective to clean the eggs, but has also been shown to clean the equipment surfaces that come into contact with the eggs and their contaminants. Accordingly, less maintenance and cleaning of the equipment is necessary.

A side-to-side brush motion and high volume recirculating water sprayed over the egg shell surface is the most gentle on the eggs. Suitable equipment is available for both 6 and 12 row egg graders and egg breakers. This gentle washing is ideal for even poor quality egg breaking stock with exposed membranes, thin shells, second quality eggs and cracked eggs.

Because the composite particles are somewhat hydrophobic, it can be helpful to use high shear mixing, vibration or sonication alone or in combination with the addition of surfactants in order to fully suspend or disperse the particles in the water.

In another embodiment of the invention, pre-measured quantities of the composite particles can be pressed into dissolvable pucks. The puck can be made by pressing the material in a mold, preferably at about 1800 to 2000 psi, so that the material can be handled without crumbling, but does not require more than a few minutes to come apart in water. Preferably, a small amount of stearic acid was brushed onto a mold before adding the product and pressing. The advantage of pucks is that a pre-measured quantity can be easily dispensed without introducing other substances into the wash water. Furthermore, the pucks will complete break up in the water after about 8 minutes to leave the particles in the water.

The effectiveness of the composite particles in egg shell washing and promoting microbial degradation of egg contaminants and debris is shown in the following examples.

EXAMPLE 1

An enzyme formula that had been in use in egg shell washing equipment was prepared and used to wash egg shells at a rate of 72,000 eggs per hour for 4 hours. The formula included 29 gallons of a mixed enzyme product in a 55-gallon drum. The mixture was then supplied to the egg washing equipment and diluted with water to 320 gallons. The mixture of enzymes included protease to break down and digest protein, amylase to break down starches and sugars, and lipase to break down fats and oils. Surfactants were also added into the wash solution.

After washing eggs with the enzyme wash, the enzymes became exhausted and the equipment had clearly visible accumulations of debris, such as egg yolk and shell buildup on the screens below the egg cleaning area. The enzyme solution cleaned 96% to 98% of the eggs washed (i.e., 2% to 4% were still dirty), which is an average rate of acceptance.

EXAMPLE 2

Composite nutrient particles were prepared by mixing the nutrients, coating the nutrients, then grinding the particles. The nutrients included 85 wt. % ammonium sulfate [$(NH_4)_2SO_4$]; 5 wt. % standard dry commercial fertilizer (including urea, diammonium phosphate, potassium chloride, limestone, dolomite limestone, ammonium sulfate, potassium sulfate, superphosphate, corncobs (pulverized), calcium lignosulfonate, mineral oil, sulfur); and 1 wt. % chelated iron. The percentages here are based on the total weight of the final coated nutrient composition. These nutrients were blended to pass a number 60 sieve before coating.

A coating material (including 60 wt. % oleic acid and 40 wt. % stearic acid) was heated to melting at about 100° C. The melted coating material was mixed with the nutrient mixture using 7 wt. % of the coating material and 91 wt. % of the nutrients. The mixture was cooled to produce a homogenous solid composite mixture and the solid composite was ground until the particles were small enough to pass through a number 40 sieve. Finally, the ground particles were mixed with 2 wt. % synthetic amorphous silica to prevent clumping. The composite powder was then stored in air-tight plastic drums until needed.

EXAMPLE 3

The fatty acid coated nutrient formulation prepared in Example 2 was added to a fresh batch of the enzyme formula according to Example 1. The nutrient/enzyme formula included the enzyme mixture, the fatty acid coated nutrient, and a surfactant.

After washing eggs at a rate of 72,000 eggs per hour for four hours similar to Example 1 with the nutrient/enzyme wash, the wash solution was still clean days later, the screens of the equipment were clean and showed no debris, and the eggs passing through the equipment had clean, shiny white shells. Furthermore, the nutrient/enzyme wash cleaned 98% to 99.5% of the eggs washed (i.e., 0.5% to 2% were still dirty), which is a significantly higher rate of acceptance than the enzyme wash of Example 1.

EXAMPLE 4

A solution was prepared for washing eggs to determine if the performance achieved in Example 3 could also be achieved without including enzymes in the wash water. The solution was prepared by combining 50 grams of the fatty acid coated nutrient formulation of Example 2, 8 oz. of a first surfactant (PLURONIC L61, available from BASF) and 8 oz. of a second surfactant (PLURONIC L62, available from BASF) that are both block copolymers of ethylene oxide and propylene oxide, per gallon of water. A total of 320 gallons of the nutrient solution or dispersion was prepared and utilized in the egg washing equipment.

After washing a batch of eggs with the nutrient wash in the same manner as in Examples 1 and 3, the wash solution was still clean, the screens were clean and showed no debris, and the eggs passing through the equipment had clean, shiny white shells. Furthermore, the eggs washed with the nutrient wash had a rate of acceptance similar to the of Example 3 (i.e., about 98% to 99.5% were clean). Furthermore, it was found that the wash solution containing the nutrient composition could achieve the same rate of acceptance even when the wash temperature was reduced to a range of 102° F. to 105° F. from a range of 108° F. to 115° F. for common alkali cleaner solutions. The amount of surfactants was reduced by 20% from that used in Example 1.

EXAMPLE 5

In order to reduce wash preparation time and improve ease of product use, it was found that the product could be added to the wash water as little as 15 minutes before the start of a wash cycle. Furthermore, it was determined that as little as one ounce of the fatty acid coated nutrient formulation of Example 2 was needed for wash solutions of less than 200 gallons and only two ounces were needed for wash solutions greater than 200 gallons. These amounts were sufficient for a 4 to 5 hour wash time.

If it is desired to maintain a high pH as a preventive measure against Salmonella, a base composition, such as potassium hydroxide, may be added to the fatty acid coated nutrient solution to increase the pH of the wash mixture, typically to about 10.5.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "a solution comprising a phosphorus-containing compound" should be read to describe a solution having one or more phosphorus-containing compound. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It will be understood that certain combinations and sub-combinations of the invention are of utility and may be employed without reference to other features in subcombinations. This is contemplated by and is within the scope of the present invention. As many possible embodiments may be made of this invention without departing from the spirit and scope thereof, it is to be understood that all matters hereinabove set forth are to be interpreted as illustrative and not in a limiting sense.

While the foregoing is directed to the preferred embodiment, the scope thereof is determined by the claims which follow:

What is claimed is:

1. A method for washing eggs, comprising:
    preparing a wash mixture of water and composite particles, wherein the composite particles comprise a mixture of microbial nutrients bound together by a solid fatty acid material,
    contacting shells of eggs with the wash mixture;
    removing organic material from the egg shells into the wash mixture; and
    using the composite particles in the wash mixture to foster microbial degradation of the organic material within the wash mixture.

2. The method of claim 1, wherein the organic material comes from the surface of the egg shells and from the yoke of any cracked eggs.

3. The method of claim 1, wherein the microbial degradation suppresses harmful bacteria.

4. The method of claim 1, wherein the step of contacting shells of eggs with the wash mixture includes spraying the wash mixture over the egg shells, collecting the sprayed wash mixture, and reusing the wash mixture to contact additional egg shells.

5. The method of claim 1, further comprising:
    reusing the wash mixture to contact additional egg shells.

6. The method of claim 5, further comprising:
    discarding the used wash mixture; and
    continue using the composite particles to foster microbial degradation of the organic materials within the discarded wash mixture.

7. The method of claim 1, wherein the microbial nutrients include nitrogen, phosphorous, and iron.

8. The method of claim 7, wherein the nitrogen is in the form of an ammonium compound, and the phosphorous is in the form of a phosphate compound.

9. The method of claim 1, wherein the solid fatty acid material is a mixture of an unsaturated fatty acid and a saturated fatty acid.

10. The method of claim 9, wherein the saturated fatty acid is selected from stearic acid, palmitic acid, lauric acid and mixtures thereof, and the unsaturated fatty acid is selected from oleic acid, linoleic acid, and mixtures thereof.

11. The method of claim 10, wherein the ratio of the saturated fatty acid to the unsaturated fatty acid is between 70:30 and 30:70 by weight.

12. The method of claim 1, wherein the wash mixture further includes a surfactant.

13. The method of claim 1, wherein the wash mixture further includes an enzyme species.

14. The method of claim 1, wherein the composite particles are a powder.

15. The method of claim 1, wherein wash mixture is substantially free of bactericidal chemicals.

16. The method of claim 1, wherein the wash mixture contains microorganisms that are substantially only indigenous microorganisms.

* * * * *